US010127249B2

(12) United States Patent
Gupta

(10) Patent No.: US 10,127,249 B2
(45) Date of Patent: Nov. 13, 2018

(54) SYSTEM AND METHOD FOR NEW DATABASE PERMITTING

(71) Applicant: Metropolitan Life Insurance Co., New York, NY (US)

(72) Inventor: Rashmi Gupta, Piscataway, NJ (US)

(73) Assignee: Metropolitan Life Insurance Co., New York, NY (US)

( * ) Notice: Subject to any disclaimer, the term of this patent is extended or adjusted under 35 U.S.C. 154(b) by 319 days.

(21) Appl. No.: 14/523,419

(22) Filed: Oct. 24, 2014

(65) Prior Publication Data

US 2015/0121453 A1    Apr. 30, 2015

Related U.S. Application Data

(60) Provisional application No. 61/895,329, filed on Oct. 24, 2013.

(51) Int. Cl.
  *G06F 17/30*    (2006.01)
  *G06F 21/62*    (2013.01)
  *G06Q 10/06*    (2012.01)

(52) U.S. Cl.
  CPC .. *G06F 17/30289* (2013.01); *G06F 17/30312* (2013.01); *G06F 17/30542* (2013.01); *G06F 21/6227* (2013.01); *G06Q 10/063* (2013.01)

(58) Field of Classification Search
  CPC ......... G06F 17/30289; G06F 17/30292; G06F 17/30297; G06F 17/30294; G06F 17/30306
  See application file for complete search history.

(56) References Cited

U.S. PATENT DOCUMENTS

| | | | | |
|---|---|---|---|---|
| 6,584,475 B1* | 6/2003 | Carey | ................ | G06F 12/0269 |
| 7,177,875 B2* | 2/2007 | Howard | ........... | G06F 17/30595 |
| | | | | 707/800 |
| 7,739,308 B2* | 6/2010 | Baffier | ...................... | G06F 8/61 |
| | | | | 707/802 |
| 7,779,045 B2* | 8/2010 | Mohamed | ......... | G06F 17/30339 |
| | | | | 707/802 |
| 7,844,570 B2* | 11/2010 | Netz | ................. | G06F 17/30592 |
| | | | | 707/601 |
| 7,870,164 B2* | 1/2011 | Miller | ............... | G06F 17/30289 |
| | | | | 707/802 |
| 8,150,886 B2* | 4/2012 | Rhodes | ............. | G06F 17/30604 |
| | | | | 707/600 |
| 8,566,318 B1* | 10/2013 | Sacco | ............... | G06F 17/30292 |
| | | | | 707/615 |
| 9,116,933 B2* | 8/2015 | John | ................. | G06F 17/30294 |
| 9,158,796 B1* | 10/2015 | Zhu | ................... | G06F 17/30587 |
| 9,244,955 B1* | 1/2016 | Esposito | ............. | G06F 11/3442 |

(Continued)

*Primary Examiner* — Tae K Kim
(74) *Attorney, Agent, or Firm* — Troutman Sanders LLP

(57) ABSTRACT

The design and implementation of databases within enterprises is a crucial process, but is often resource intensive and often times unnecessary as existing databases may be utilized to serve the same goals. Tracking existing databases and assessing the design specifications of proposed databases is a complex decision making process. Disclosed is a system and computer-based method for systematically controlling the approval, creation and modification of databases. The system provides a policy for enterprise governance control for database proliferation and a tool for comparing database requests to and against existing database assets.

16 Claims, 3 Drawing Sheets

(56) References Cited

U.S. PATENT DOCUMENTS

| | | | |
|---|---|---|---|
| 2003/0126160 A1* | 7/2003 | Engelhardt-Cronk | ........................ G06F 17/30306 |
| 2005/0198630 A1* | 9/2005 | Tamma | ..................... G06F 8/65 717/175 |
| 2007/0288495 A1* | 12/2007 | Narasayya | ......... G06F 17/30306 |
| 2008/0183644 A1* | 7/2008 | Bruno | ............... G06F 17/30306 706/12 |
| 2008/0295092 A1* | 11/2008 | Tan | ........................... G06F 8/61 717/178 |
| 2009/0063559 A1* | 3/2009 | Rhodes | .............. G06F 17/30569 |
| 2009/0132576 A1* | 5/2009 | Miller | ............... G06F 17/30498 |
| 2009/0254572 A1* | 10/2009 | Redlich | .................. G06Q 10/06 |
| 2010/0114976 A1* | 5/2010 | Castellanos | ........ G06F 17/30312 707/803 |
| 2011/0231454 A1* | 9/2011 | Mack | ................. G06F 17/30569 707/803 |
| 2012/0005241 A1* | 1/2012 | Ortel | ................. G06F 17/30294 707/803 |
| 2012/0066264 A1* | 3/2012 | Shaked | ............. G06F 17/30306 707/792 |
| 2012/0310996 A1* | 12/2012 | Kulack | ............. G06F 17/30404 707/810 |
| 2013/0173541 A1* | 7/2013 | Iyer | ................... G06F 17/30297 707/625 |
| 2013/0311446 A1* | 11/2013 | Clifford | ............ G06F 17/30469 707/719 |
| 2014/0280373 A1* | 9/2014 | Raitto | ............... G06F 17/30292 707/803 |
| 2014/0317045 A1* | 10/2014 | Quine | ........................ G06F 8/34 707/601 |

* cited by examiner

SYSTEM AND METHOD FOR NEW DATABASE PERMITTING

CROSS-REFERENCE

This application claims priority to U.S. Provisional Application No. 61/895,329 filed Oct. 24, 2013, the content of which is incorporated by reference herein as if it was restated in full.

BACKGROUND

Databases are a powerful tool for storing and organizing large amounts of data in a more or less centralized location. Over the past decade, there has been an explosion in data generation and storage creating data management issues never encountered before and placing huge burdens on traditional database tools. A new concept has been coined—"big data"—reflecting the new sources of largely unstructured data that flows into and through computer networks from e.g., Twitter and the like.

In addition to sheer data volume and bandwidth, storage has moved and is structured more around a network protocol with cloud data management offering many benefits including faster access and more easily applied redundancies. To be properly implemented, databases are designed depending on data volume, structure, access speed and ultimate use in one or more applications or platforms.

Databases are often created for specific purposes or projects, such as application development. Without proper management tools, the proliferation of project-specific databases created within an enterprise can easily spiral out of control with each added database possibly requiring the addition of server equipment, storage space, software licenses, support staff, maintenance costs, security overhead, and possible data duplicity. The ever increasing footprint of databases also raises issue of data quality and calls for monitoring system and governance controls.

DETAILED DESCRIPTION

The present invention provides a system and computer-implemented process framework with a service model and operational model for managing the creation of new databases within an enterprise. The invention further provides a protocol for managing multiple, distinct databases within an enterprise through the use of database tools. These tools include a hierarchical development model that provides a methodology for ranking and tracking databases and database creation requests by developers. In particular, this tool provides a streamlined solution for determining the relative value and cost of implementing a request for new database by weighing the needs of the requester against the existing assets and associated costs of procuring new assets.

The service model describes an IT policy, architecture standards and engagement model with partners. The operational model has processes to ensure enterprise application development adoption by integrating with project lifecycle (SDLC) and user requests workflows. A dashboard with key performance indicators (KPI) may also be a required part of final project delivery. The controls were incorporated for re-use and ever greening (metadata repository management), and periodic auditing by using database tools for different database platforms.

Figure 1:
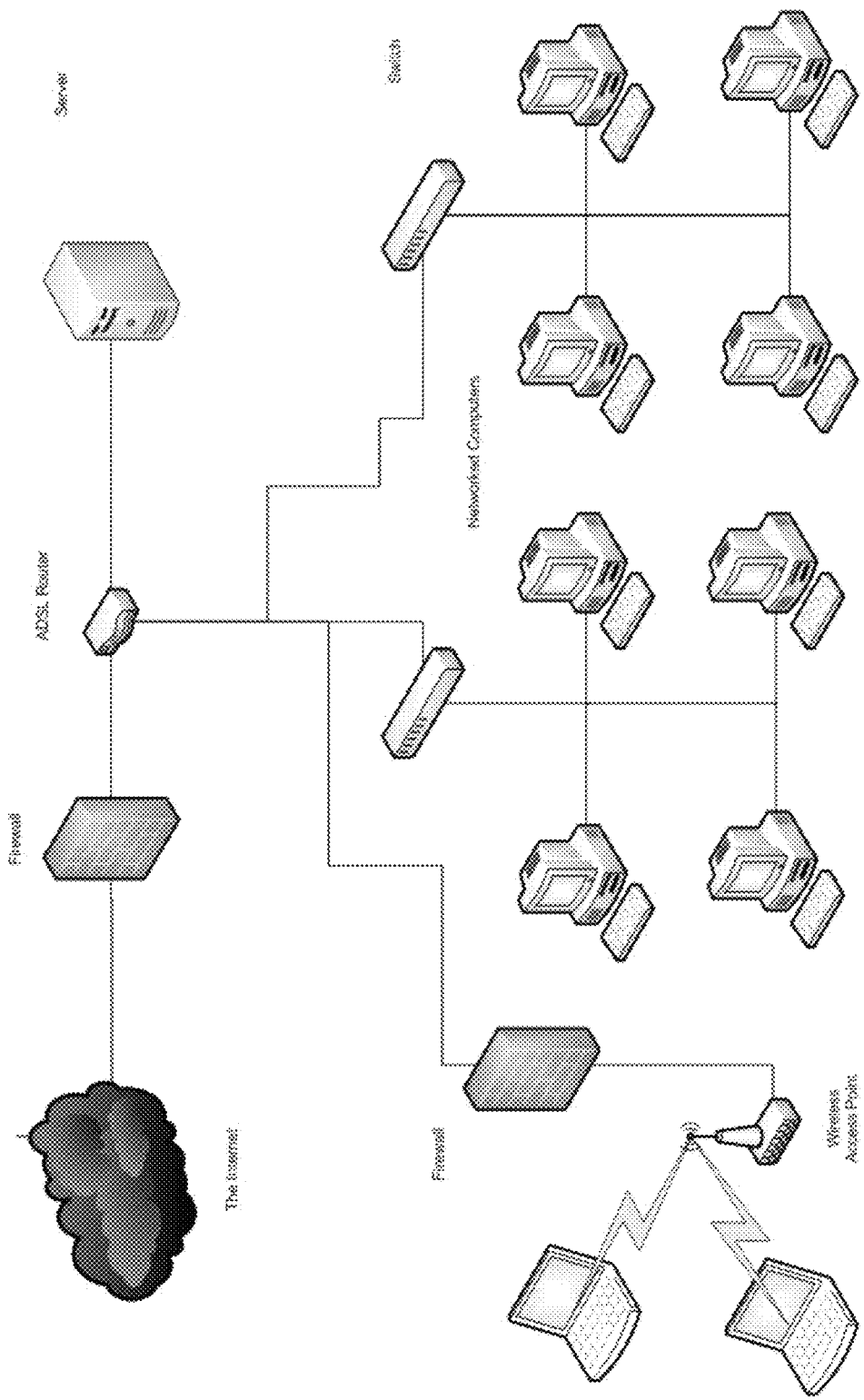
FIG. 1 depicts a network-based, hardware environment for an enterprise implementation of the inventive database tools of the present invention.

System operation is depicted in FIG. 1—a functional block diagram of an operative network environment that supports implementation of the database management tools. Specifically, the network will include both local and remote servers with processing.

Figure 2:
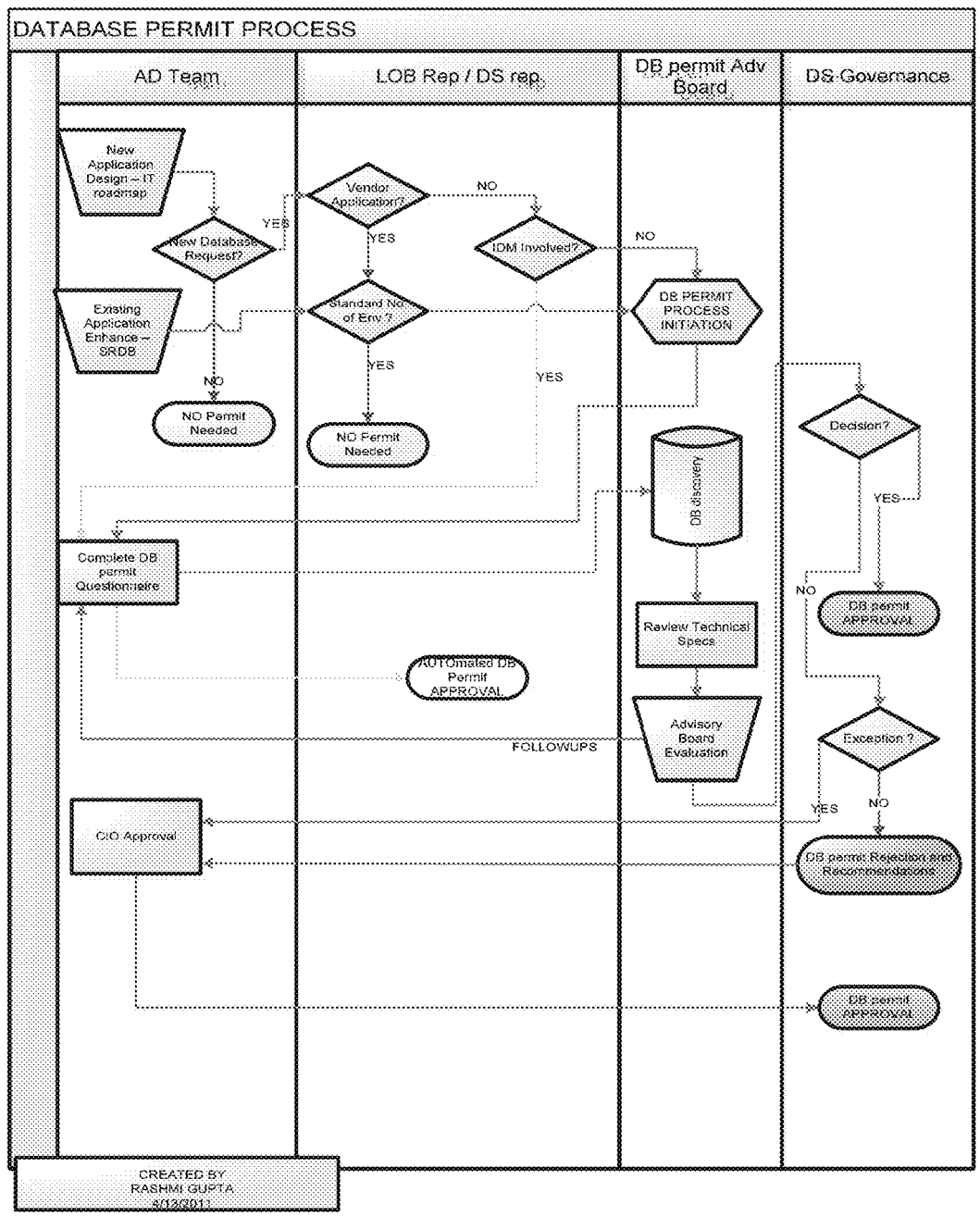
FIG. 2 illustrates a high-level process for a database building permit application and approval workflow.
Figure 3:
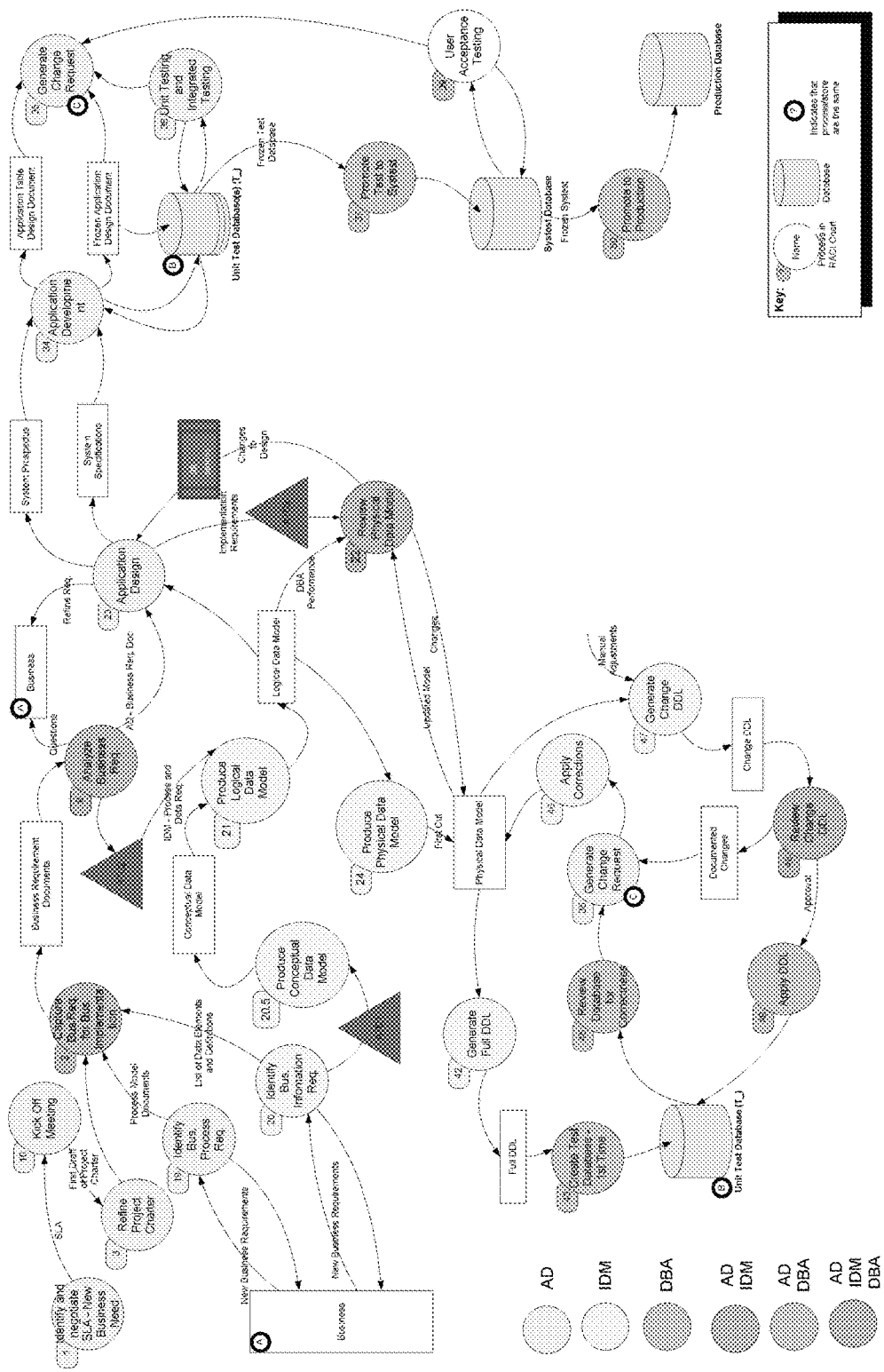
FIG. 3 illustrates a workflow for a database design and database building permitting process.

Turning now to FIGS. 2 and 3, these diagrams provide two levels of detail with respect to programming logic for system operation. FIG. 2 provides a high level flow diagram that depicts overall logic for the approval process for each new database proposed for system implementation. FIG. 3 provides additional details regarding system operation through a managed information/data flow chart—while logical relationships are implicit in each such relationship.

A database request is provided as an input to the system. The request may seek the creation of a new database, extension/enhancement of an existing database, copy of an existing database, or the archiving of an existing database. The request includes required database specifications, such as name, content, database application, data types, data parameters, data structure, stored location, network accessibility, security, web connectivity, administrative rights, user rights, number of users, etc. The database specification parameters will vary according to the common needs of the user organization. The data from the database request may be entered into the system manually from a form, or directly by the requester through electronic means, such as a web-based form or a user interface to the system.

In the case of a request for a new database or extension to an existing database, the system compares the requested specifications and attributes against the specifications and attributes of existing or planned databases. Exact matches are found when all requested specifications are found in an existing or planned database. For non-exact matches, a relevancy rating may be calculated to grade the degree of similarity between the requested specifications and existing or planned database specifications. Depending on the variance suitability threshold, a non-exact match may be determined to be suitable to meet the needs of the requester. Fuzzy logic searches may be used to determine suitability of non-exact matches. Suitable database matches signify an opportunity for reuse.

In the case of a request for a new database or extension to an existing database, the system determines if there are any compliance and/or regulatory barriers to approving the request. The system may also determine if there are conflicts between the predefined security policies of the organization and the parameters specified in the request, or if accessibility to sensitive or confidential data violates any security policy.

In the case of requests to create a new database, or to copy or extend an existing database (i.e. requests that increase the storage use or total number of databases), the system may determine if the database application and/or organizational standards allow for the prospective expanded number of allowable database environments and storage use. For example, in a Microsoft Access 2010 database environment, the total number of objects is limited to 32,768.

In the case of requests to create a new database, or to copy, extend or archive an existing database, the system may determine if there is adequate server capacity to satisfy the database request. The system calculates the current server capacity usage or receives this data as an input. The server capacity calculation takes into account parameters such as storage space, processor usage, bandwidth utilization, etc. Additional, off-site server capacity may also be accounted for in this calculation.

The system analyzes the result of one or more of the determinations made above, and determines whether the request is approved, rejected or requires additional information. The determination is returned to the requester and/or the systems administrators/application development team for implementation.

The invention described above is operational with general purpose or special purpose computing system environments or configurations. Examples of well-known computing systems, environments, and/or configurations that may be suitable for use with the invention include, but are not limited to: personal computers, server computers, hand-held or laptop devices, smart phones such as iPhones™, tablet devices such as iPads™, multiprocessor systems, microprocessor-based systems, set top boxes, programmable consumer electronics, network PCs, minicomputers, mainframe computers, distributed computing environments that include any of the above systems or devices, and the like.

Components of the inventive computer system may include, but are not limited to, a processing unit, a system memory, and a system bus that couples various system components including the system memory to the processing unit.

The computer system typically includes a variety of non-transitory computer-readable media. Computer-readable media can be any available media that can be accessed by the computer and includes both volatile and nonvolatile media, and removable and non-removable media. By way of example, and not limitation, computer-readable media may comprise computer storage media and communication media. Computer storage media may store information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The computer system may operate in a networked environment using logical connections to one or more remote computers. The remote computer may be a personal computer, a server, a router, a network PC, a peer device or other common network node, and typically includes many or all of the elements described above relative to the computer. The logical connections depicted in include one or more local area networks (LAN) and one or more wide area networks (WAN), but may also include other networks. Such networking environments are commonplace in offices, enterprise-wide computer networks, intranets and the Internet.

For ease of exposition, not every step or element of the present invention is described herein as part of software or computer system, but those skilled in the art will recognize that each step or element may have a corresponding computer system or software component. Such computer systems and/or software components are therefore enabled by describing their corresponding steps or elements (that is, their functionality), and are within the scope of the present invention. In addition, various steps and/or elements of the present invention may be stored in a non-transitory storage medium, and selectively executed by a processor.

The foregoing components of the present invention described as making up the various elements of the invention are intended to be illustrative and not restrictive. Many suitable components that would perform the same or similar functions as the components described are intended to be embraced within the scope of the invention. Such other components can include, for example, components developed after the development of the present invention.

The invention claimed is:

1. A computer-implemented method for managing creation of new databases, comprising:
   receiving input related to at least one proposed database design;
   generating, by one or more data processors, a report summary of one or more costs and benefits associated with the proposed database design, wherein the reported costs account for the resources required by the design from system operations and reported benefits account for the advantages provided by the design through specific applications relative to the use of existing databases;
   calculating, by one or more data processors, a relative value index that measures the overall ranking of the proposed database design relative to a current population of enterprise implemented databases;
   developing, by one or more data processors, an approval recommendation report based on the calculated value index,
   determining, by one or more data processors, an opportunity for reuse of an existing database, when the proposed database design is associated with at least one of creating a new database and extending an existing database;
   comparing, by one or more data processors, a specification and an attribute associated with the proposed database design to that of the existing database to determine if there is a match;
   when the match is not found, calculating, by one or more data processors, a relevancy rating to grade a degree of similarity between the specification associated with the proposed database design and that of the existing database;
   comparing the relevancy rating to a variance suitability threshold; and
   determining that the existing database is suitable for reuse when the relevancy rating meets the variance suitability threshold;
   wherein the proposed database design is associated with at least one of creating a new database, extending or enhancing an existing database, copying the existing database, and archiving the existing database.

2. A computer-implemented method for managing creation of new databases, comprising:

receiving input related to at least one proposed database design;

generating, by one or more data processors, a report summary of one or more costs and benefits associated with the proposed database design, wherein the reported costs account for the resources required by the design from system operations and reported benefits account for the advantages provided by the design through specific applications relative to the use of existing databases;

calculating, by one or more data processors, a relative value index that measures the overall ranking of the proposed database design relative to a current population of enterprise implemented databases;

developing, by one or more data processors, an approval recommendation report based on the calculated value index;

determining, by one or more data processors, an opportunity for reuse of an existing database, when the proposed database design is associated with at least one of creating a new database and extending an existing database;

comparing, by one or more data processors, a specification and an attribute associated with the proposed database design to that of the existing database to determine if there is a match;

when the match is not found, calculating, by one or more data processors, a relevancy rating to grade a degree of similarity between the specification associated with the proposed database design and that of the existing database;

comparing the relevancy rating to a variance suitability threshold;

determining that the existing database is suitable for reuse when the relevancy rating meets the variance suitability threshold;

determining, by one or more data processors, if there exists a compliance barrier to approving the proposed database design;

determining, by one or more data processors, if the proposed database design violates a predefined security policy; and when the proposed database design requests an increase in a storage use or total number of databases, determining, by one or more data processors, if the requested increase is allowable.

3. The method of claim 2, further comprising determining, by one or more data processors, if there exists an adequate server capacity to satisfy the proposed database design, when the proposed database design is associated with at least one of creating a new database, copying an existing database, extending the existing database, and archiving the existing database.

4. The method of claim 3, further comprising calculating, by one or more data processors, the adequate server capacity by taking into account at least one of storage space, processor usage, bandwidth utilization and off-site server capacity.

5. The method of claim 1, wherein the proposed database design is associated with creating a new database.

6. The method of claim 1, wherein the proposed database design is associated with extending or enhancing an existing database.

7. The method of claim 1, wherein the proposed database design is associated with at least one of copying the existing database and archiving the existing database.

8. A network based computer system that supports multiple databases, said system comprising:

a first storage media for storing one or more databases in operative connection with said network;

a communication matrix for allowing digital commands and data to base between a network server and said first storage media, said commands for implementing database access protocols;

a data input interface for presenting a new database proposal for addition to the enterprise database infrastructure;

said network server comprising logic commands to implement a database management tool to track and monitor database usage and efficiency, to develop a relative ranking of the value of said plural databases stored in said first storage media and to assist in evaluating one or more proposed databases received from said input interface;

a report generation module for developing recommendations based on operative database characteristics developed by said tool for use in approval of said database proposal, wherein the database management tool determines an opportunity for reuse of an existing database, when the database proposal is associated with at least one of creating a new database and extending an existing database, wherein the database management tool compares a specification and an attribute associated with the database proposal to that of the existing database to determine if there is a match, wherein when the match is not found, the database management tool calculates a relevancy rating to grade a degree of similarity between the specification associated with the proposed database design and that of the existing database, compares the relevancy rating to a variance suitability threshold, and determines that the existing database is suitable for reuse when the relevancy rating meets the variance suitability threshold;

wherein the database management tool determines if there exists a compliance barrier to approving the proposed database design;

wherein the database management tool determines if the proposed database design violates a predefined security policy; and wherein when the proposed database design requests an increase in a storage use or total number of databases, the database management tool determines if the requested increase is allowable.

9. The system of claim 8, wherein the database proposal is associated with at least one of creating a new database, extending or enhancing an existing database, copying the existing database, and archiving the existing database.

10. The system of claim 8, wherein the match is found when the specification associated with the database proposal is found in the existing database.

11. The system of claim 8, wherein the database management tool determines if there exists an adequate server capacity to satisfy the database proposal, when the database proposal is associated with at least one of creating a new database, copying an existing database, extending the existing database, and archiving the existing database.

12. The system of claim 11, wherein the database management tool calculates the adequate server capacity by taking into account at least one of storage space, processor usage, bandwidth utilization and off-site server capacity.

13. The method of claim 9, wherein the database proposal is associated with creating a new database.

14. The method of claim 9, wherein the database proposal is associated with extending or enhancing an existing database.

15. The method of claim 9, wherein the database proposal is associated with at least one of copying the existing database and archiving the existing database.

16. The method of claim 2, wherein the match is found when the specification associated with the proposed database design is found in the existing database.

\* \* \* \* \*